Patented Jan. 21, 1930

1,744,500

UNITED STATES PATENT OFFICE

SCOTT H. PERKY, OF BATAVIA, NEW YORK

PROCESS OF MAKING CEREAL PRODUCT

No Drawing.   Application filed February 28, 1925. Serial No. 12,225.

My invention relates to a cereal food product and a process of making same.

The primary object of my invention is to devise a process for the preparation of whole wheat grains that will preserve the properties thereof which are useful for human consumption and that will transform the grains into a palatable state.

A further object of my invention is the producing of a food product, made from whole wheat grains, that shall be thoroughly cooked before reaching the ultimate consumer, in order to render available the nutriment of the wheat berry in its most digestible condition.

A further object of my invention is the producing of a food product of the character described which when prepared for the table with the usual liquids, retains a sufficient proportion of its normal degree of solidity to induce thorough mastication, thereby insuring a proper stimulation of the salivary glands and assisting the digestion.

My improved food product may be properly classed with the so-called breakfast foods. Those which have heretofore been made from the wheat berry are usually characterized by one or more of the deficiencies, noted hereinafter, which materially detract from their value as complete foods.

Certain of these foods reach the consumer in either a partly cooked, or a wholly uncooked, condition, necessitating further cooking preparation before the food is ready for actual use. As the means available for such final cooking are ordinarily of a character that is unsuitable for the particular requirements necessary for transforming the elements of the wheat grain into a state, easily assimilable by the human system, it is obvious that the full benefit of the grain, as a food, is not consistently obtained. The same result ensues under conditions where ample cooking facilities are accessible, but where the precise instructions regarding the preparation of the food are not followed by the consumer. In either case, the food is eaten in a partly cooked condition. Other foods, by reason of their method of preparation, do not contain the full nutriment and flavor of the wheat berry and are therefor inferior as a thoroughly adequate food. This particular defect characterizes those foods which are either partly cooked, or which reach the consumer in condition for immediate use. Still other foods, made from wheat, exhibit a mushy property when prepared for the table and hence are valueless as a means of promoting a flow of saliva to aid in digesting the same, while others are so poorly composed that separation of the bran from the remainder of the wheat occurs during mastication, leaving the bran resistant to the teeth.

It is the purpose of my process to produce a food that contains all the elements of the wheat berry prepared in a palatable form. Being thoroughly cooked, it is particularly desirable for children and invalids and as it retains a suitable proportion of its normal degree of solidity, it offers sufficient resistance during mastication to properly stimulate the salivary glands.

These and further objects of my invention will be set forth in the accompanying specification and the novel means by which said objects are effectuated will be definitely pointed out in the claims.

In carrying out my improved process, the wheat grains are first thoroughly cleaned in any approved manner, thus removing all foreign substance and preparing the grains for reduction. The wheat is then partly cooked in order to soften the grains and render possible the obtention of a thoroughly homogeneous product when the grains are passed through the reduction rolls. For some grades of wheat, this step in the process may be eliminated, or other softening methods utilized.

Curing or tempering of the wheat comprises the next step in the process. This removes a sufficient percentage of the moisture content of the partially cooked berries to prevent any excessive adherence thereof to the reduction rolls and also possesses the practical advantage of softening and otherwise conditioning the wheat for said rolls for which a particular consistency is desirable.

This step in the process also serves to render the wheat more digestible.

The reduction machine is composed either of one smooth and one circumferentially grooved roll, or of one smooth roll and one circumferentially and longitudinally grooved roll, or of two such grooved rolls provided with combs, or scrapers, for removing the product therefrom. I do not desire to be limited to the particular kind of rolls heretofore described, as the essence of this step in the process is the reduction of whole wheat grains, partly cooked and tempered, to a thoroughly mixed condition by a direct and single action. It is contemplated that these rolls shall be placed in contact, the wheat therefore being forced into the grooves from which it is removed by the scrapers.

At this stage, the substance is moist and pliable and is then cooked for several hours in any approved form of apparatus, using only an amount of water that can be absorbed by the product, thus transforming the elements of the grains into a condition easily assimilable by the human system.

The product is then permitted to cool, finally achieving a partly gelatinous state, when it may be dried in sheets or sliced into strips and dried. After cooling, the sheets or strips are dehydrated in a suitable oven, causing them to become brittle and to exhibit a flinty character. These sheets or strips are then ground to produce granules of any desired size, when the product is ready for marketing.

Being thoroughly cooked, the product may be eaten without further preparation, but the preferred mode is to boil the product in water three or more minutes in order to cause absorption thereof by the granules, thereby effecting a hot food. As the product before boiling, is essentially a dehydrated substance, its use is comparatively economical, for it requires only a small amount of the same, when treated as above, to produce an ample portion for serving.

Further, since my food product contains all the constituent parts of the wheat berry, it is obvious that it possesses superior qualifications as a food. Starch, the proteids comprising the valuable gluten, the mineral salts, notably those of sodium, potassium, and iron, and bran which has come to be recognized as possessing marked properties as a natural regulator, are all comprehended in my improved food in a palatable form and, partly by reason of its solid, granular character, which induces thorough mastication, one that is easily digested.

I claim:—

1. The herein described process of preparing a food from whole wheat grains which consists in softening and reducing said grains to a thoroughly mixed mass, cooking and dehydrating said mass, and changing the residue into a granular state.

2. The herein described process of preparing a food from whole wheat grains which consists in partly cooking said grains, reducing the partly cooked grains so that the elements thereof will combine to form a thoroughly mixed mass, further and completely cooking said mass, dehydrating the same and grinding the residue.

3. The herein described process of preparing a food from whole wheat grains which consists in partly cooking and tempering said grains, reducing the partly cooked grains so that the elements thereof will combine to form a thoroughly mixed mass, further and completely cooking said mass, dehydrating the same and grinding the residue.

4. The herein described process of preparing a food from whole wheat grains which consists in partly cooking and tempering said grains, reducing the partly cooked grains so that the elements thereof will combine to form a thoroughly mixed mass, further and completely cooking said mass in an amount of water that can be absorbed thereby, dehydrating the same and grinding the residue.

In testimony whereof, I affix my signature.

SCOTT H. PERKY.